Oct. 21, 1924.
A. SOLOSABAL
1,512,504
DIRIGIBLE MECHANISM FOR HEADLIGHTS
Filed April 6, 1923     2 Sheets-Sheet 1
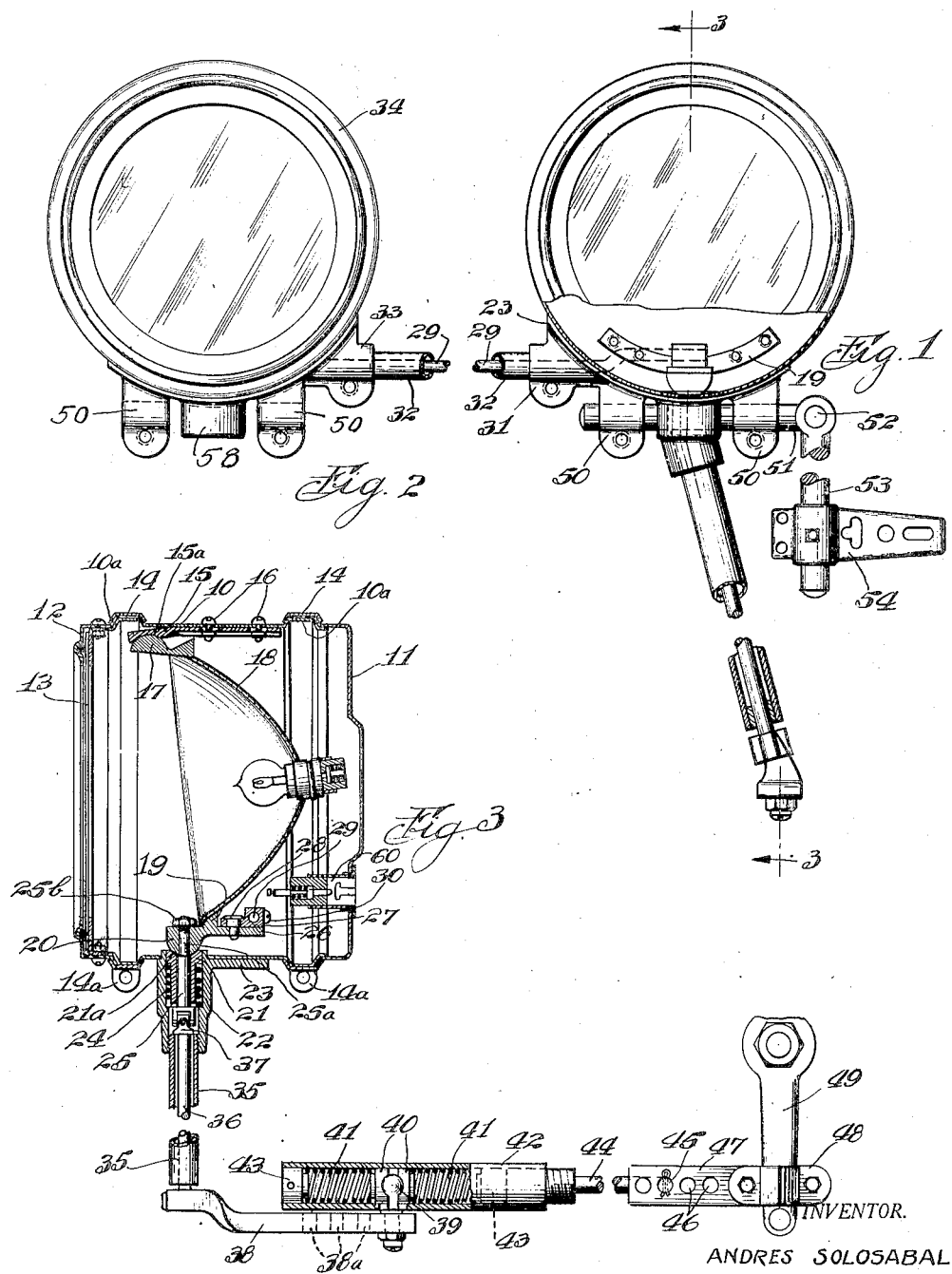
INVENTOR.
ANDRES SOLOSABAL
BY Albert C. Bell
ATTORNEY.

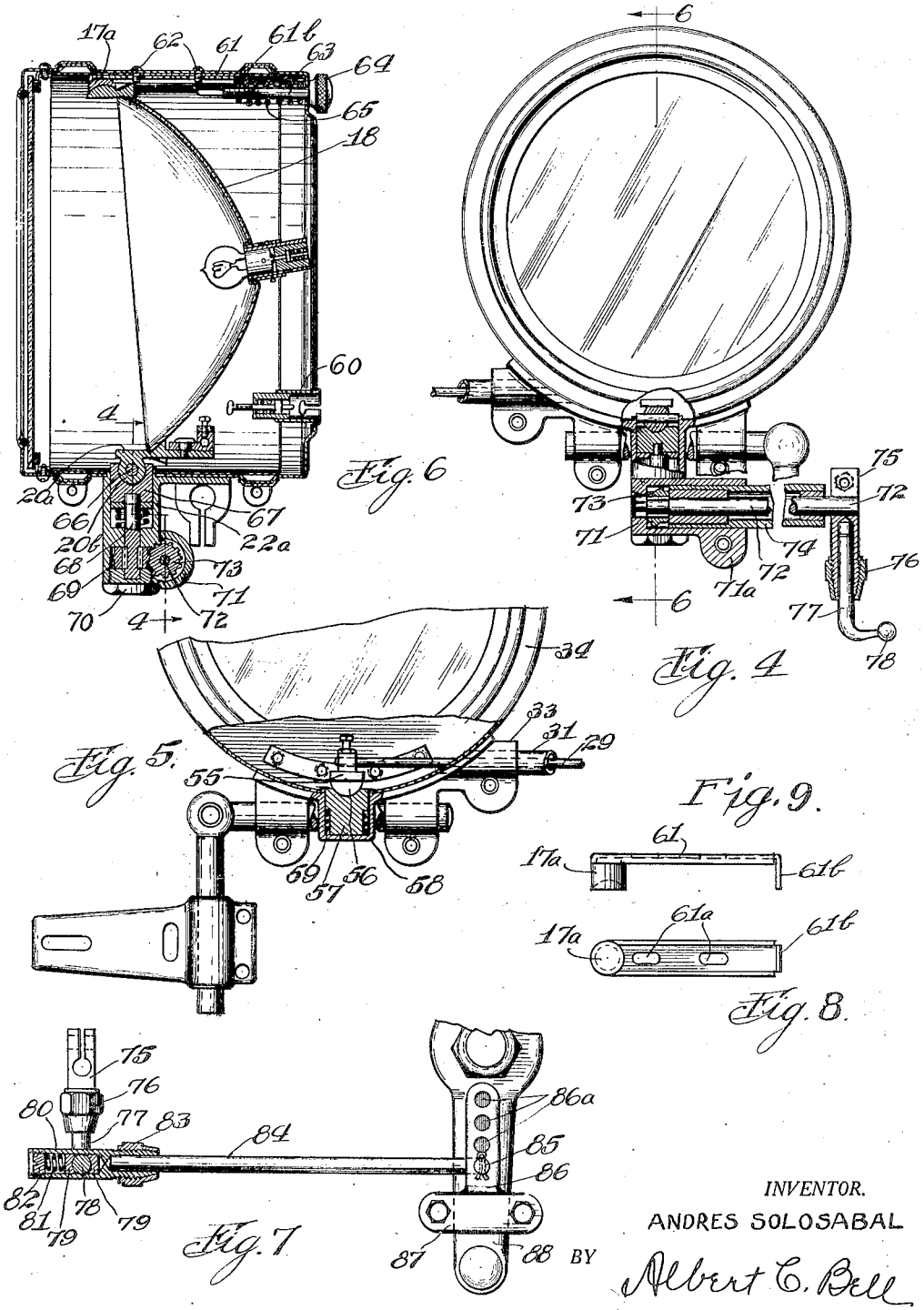

Patented Oct. 21, 1924.

1,512,504

UNITED STATES PATENT OFFICE.

ANDRES SOLOSABAL, OF BOISE, IDAHO.

DIRIGIBLE MECHANISM FOR HEADLIGHTS.

Application filed April 6, 1923. Serial No. 630,195.

*To all whom it may concern:*

Be it known that I, ANDRES SOLOSABAL, a citizen of the United States, residing at Boise, in the county of Ada and State of Idaho, have invented a new and useful Improvement in Dirigible Mechanism for Headlights, of which the following is a specification.

My invention relates to an improvement in dirigible headlights by which the reflectors of the headlights may be adjusted on horizontal axes to give a proper inclination to the projected rays vertically, and for any adjustment on said horizontal axes, that the reflectors may be turned on vertical axes by connecting devices extending to the steering mechanism of the vehicle, so that the direction of the projected rays will correspond with the direction of motion of the vehicle, whether straight ahead or in a turning direction. My invention is characterized by mechanism for accomplishing the adjustments and movements referred to, which is simple in construction, positive in operation, of good appearance and practical to manufacture and operate.

My invention will best be understood by reference to the accompanying drawings showing preferred embodiments thereof, in which—

Fig. 1 shows in front elevation one of the headlights of my dirigible system from which the connecting devices extend to the steering mechanism, Fig. 2 shows in a view similar to Fig. 1 the other one of the pair of headlights intended for use on the motor vehicle, Fig. 3 is a sectional view of the parts shown in Fig. 1 taken along the line 3—3 and in this view there is also shown the connecting mechanism extending to the steering mechanism for operating the reflector of the headlight shown in Fig. 1, Fig. 4 shows in a view similar to Fig. 1 a modified form of operating mechanism by which gearing is employed to rotate the reflector on its vertical axis, Fig. 5 shows in a view similar to Fig. 2 the second headlight of the pair using the construction shown in Fig. 4, Fig. 6 is a sectional view through the parts shown in Fig. 4 taken along the line 6—6, Fig. 7 is a detail view of the connecting devices extending from the reflector operating mechanism shown in Fig. 4 to the steering mechanism of the vehicle, Fig. 8 shows in bottom view the bracket employed with the construction shown in Fig. 6 to adjust the reflector on its horizontal axis, and

Fig. 9 shows in side elevation the bracket construction illustrated in Fig. 8.

Similar numerals refer to similar parts throughout the several views.

As shown in Figs. 1 and 3, the casing of the headlight consists of a tubular shell 10 having outwardly extending beads $10^a$, $10^a$ adjacent its ends for engaging the outwardly flanged ends of the back 11 of the casing and the ring 12 in which the enclosing glass 13 is mounted. Flanged rings 14 surround the beads $10^a$, $10^a$ and the adjacent flanges of the parts 11 and 12 to clamp them together, said rings being held tightly in engagement with the parts referred to by means of clamping lugs $14^a$, $14^a$ through which suitable clamping bolts, not shown, extend.

The casing contains in its upper portion a slidable bar 15 held in place by clamping screws 16 which extend through slots therefor in the bar 15 into engagement with nuts as indicated. The bar 15 extends from front to rear of the casing and at its front end on its lower surface is provided with a socket $15^a$ for receiving a ball 17 secured to and carried by the upper forward edge of the reflector 18. The engagement between the ball 17 and socket $15^a$ permits turning movement of the reflector in any direction. The forward edge of the lower portion of the reflector has secured thereto by suitable fastening devices, for example rivets, a plate 19 carrying at its mid portion a ball 20 engaging a socket $21^a$ formed in the upper end of a sleeve 21, said sleeve being mounted in vertical position in a suitable bore formed in the boss 22 extending vertically downwards from a plate 23 secured to the lower part of the headlight casing. A clearance space is provided between the sleeve 21 and the bore therefor in the boss 22 for receiving a spring 24 engaging a shoulder on the sleeve 21, said spring tending to hold the ball and socket joints above referred to, tightly in engagement with each other to prevent rattling of the parts. The ball 20 is provided with a clearance opening extending vertically through it to receive the upper end $25^a$ of an operating rod 25, a nut $25^b$ being provided on the end of the rod $25^a$ to hold the parts together. The ball 20 is provided with a rearwardly extending arm 26 to which a block 27 is pivotally connected at 28, said block having a hole therein for receiving one end of a rod 29 for operating the reflector of the other headlight of the pair, said rod being held in the block 27 by a set screw 30. The mounting plate 23 has projecting therefrom a split boss 31 containing one end of a tube or pipe 32 extending horizontally from the boss 31 to a similar boss 33 carried by the other headlight 34 of the pair of headlights, said tube or pipe 32 constituting a housing for the rod 29 between the headlights.

The tubular boss 22 has extending from its lower end a pipe housing 35 containing an operating rod 36 connected at its upper end with the lower end of the rod 25 by a universal connection 37 by which the rod 25 and reflector 18 may be rotated for any desired adjustment of the bar 15. The lower end of the rod 36 carries a crank arm 38 having a plurality of connecting holes 38$^a$, in a desired one of which a ball stud 39 is secured with its spherical end between recessed bearing blocks 40 held in engagement therewith by compression springs 41 contained in a tubular shell 42, which also contains the blocks 40. The shell 42 is also provided with plugs 43 which may be secured to the shell 42 in proper position to give desired adjustment to the blocks 40 and desired compression to the springs 41 to prevent rattling of the parts and secure desired operation of the rod 36. The side wall of the housing 42 is provided with an opening to permit the insertion of the ball on the stud 39 and clear said stud during operation of the mechanism. The housing 42 is secured to one end of a rod 44, the other end of which is provided with an enlarged head as indicated for receiving a pin 45 extending through a desired one of the holes 46 provided therefor in links 47 secured to a clamping device 48 for engaging the arm 49 of a standard steering mechanism well known in connection with motor vehicles, said clamping device 48 being located as desired on the arm 49 to give a desired amount of motion to the rod 44 for operation of the arm 49 in steering the vehicle. As a result of the construction described, operation of the steering arm 49 rotates the rod 36 and therefore the reflector 18 on its vertical axis so that the light from the headlight will follow the direction of travel of the vehicle corresponding with the position of the steering arm 49.

As indicated in Fig. 1, the plate 23 is provided with two downwardly extending split bosses 50, 50 for receiving a supporting rod 51, suitable clamping devices being provided to hold the bosses in desired adjustment on the rod. The rod 51 at one end is pivotally connected as indicated at 52 with a second rod 53 supported in a bracket 54 by suitable fastening devices and the bracket 54 may be secured in any convenient manner, for example screws or rivets, to the fender or frame work of the motor vehicle.

As indicated in Fig. 5, the headlight 34 is provided with supporting devices similar to those shown and described in connection with Fig. 1, and as shown in Fig. 5 the rod 29 engages an arm 55 similar to the arm 26, which is similarly secured to the reflector of the headlight and provided with a supporting ball 56 resting in a socket therefor in a bearing member 57 carried in a boss 58 projecting downwardly from the casing of the headlight 34. A spring 59 is disposed in the boss 58 around the lower end of the member 57 to prevent rattling of the parts and to hold the ball and socket reflector supports of the headlight 34 in engagement with each other. The upper portion of the headlight 34 is constructed in the same manner described above for the headlight shown in Figs. 1 and 3 and is provided with similar devices for adjusting the reflector on a horizontal axis.

The rear wall of the casing 11 is provided with a socket 60 for receiving a pilot light, which may be used to indicate that the light in the headlight is burning properly, or if desired to serve any other purpose.

In the construction shown in Figs. 4, 5 and 6, the casing of the headlight is constructed in substantially the manner above described, and the upper edge of the reflector 18 is provided with a support substantially the same as above described, the difference being that the socket member 17$^a$ is secured to one end of an operating member 61, which as more clearly indicated in Fig. 8, is provided with longitudinal slots 61$^a$ for engaging screws 62 forming a guide for said member and a downwardly extending flange 61$^b$ for engaging the threaded end of an operating screw 63 extending through the rear wall of the casing and provided on its outer end with an operating head 64. A spring 65 is disposed around the screw 63 between the flange 61$^b$ and the inner surface of the rear wall of the casing to hold the upper edge of the reflector 18 as far forwardly as the adjustment of the screw 63 will permit, and preventing rattling of the parts.

The lower edge of the reflector 18 as shown in Fig. 6, has secured thereto an operating member 20$^a$ connected in substantially the manner above described with the reflector of the headlight, the said member 20$^a$ being provided with a downwardly extending ear 20$^b$ engaging a pivot rod 66 for connecting the member 20$^a$ to a supporting block 67 rotatably mounted in a hollow boss 22$^a$ projecting downwardly from the casing. The rod 66 constitutes a horizontal pivot on which the reflector 18 may be turned by the screw 63. The block 67 has extending downwardly therefrom a short shaft 68 rigidly secured to said block and carrying in the lower portion of the boss, a helical gear 69 which is rigidly secured to said shaft. The shaft and gear are held in place preferably by a screw plug 70 threaded in the lower end of the boss 22ª. The boss 22ª has extending therefrom a second boss 71 disposed in substantially horizontal position and carrying a bearing for the shaft 72 to which a second helical gear 73 is rigidly secured, said gears 69 and 73 being disposed in mesh with each other, so that rotation of the shaft 72 rotates the shaft 68 and therefore rotates the reflector on a vertical axis. The boss 71 is provided with a split clamping portion 71ª for securely engaging one end of a pipe housing 74 enclosing and protecting the shaft 72, said housing also serving to support in a suitable bearing the outer end of said shaft. The shaft 72 has secured to its outer end an operating arm 75 which, as more clearly shown in Fig. 7, is split so that it may tightly clamp the shaft by means of suitable clamping devices. The arm 75 is provided at its outer end with a tapered threaded collar 76, said arm being bored longitudinally to receive in adjustable relation an operating crank 77 held tightly in the arm 75 by compression of the split outer end of the arm, on tightening of the tapered collar 76. The rod 77 carries at its outer end a ball 78 which, as more clearly shown in Fig. 7, is engaged by recessed blocks 79 contained in a tubular housing 80 and held in engagement with the ball 78 by a spring 81 contained in said housing, the other end of said spring being held in place by an adjustable plug 82 in threaded engagement with the end portion of a housing 80. The housing 80 is provided at its other end with a tapered clamping collar 83 similar to the collar 76, which similarly clamps the end of the housing 80 firmly in engagement with the connecting rod 84, the other end of said connecting rod having a pin connection 85 with any desired one of the holes 86ª in an arm 86 secured by clamping devices 87 to the steering arm 88 of a standard steering mechanism of a motor vehicle. As a result of the construction described, motion of the steering arm 88 rotates the shaft 72 and therefore rotates the shaft 68 through the gearing described, to rotate the reflectors of the headlights so that the projected light will be in a direction corresponding with that of the vehicle determined by the position of the steering arm 88. It will be observed that the clamping collars 76 and 83 provide a ready means for changing the effective lengths of the operating arm 75 and the connecting rod 84, thus readily facilitating adjustment of the mechanism to meet the requirements of any particular case. It will also be understood that the adjustments of the reflectors referred to on horizontal axes are advantageous for two reasons, first, that the roadway may be properly illuminated and second, that the beams of light may be projected downwardly sufficiently so that they will not produce a glare in the eyes of pedestrians and in the eyes of the drivers of other motor vehicles. The other headlight of the pair, using the construction of headlight shown in Figs. 4 and 6 as one of the pair, may be the same as above described and shown in Fig. 5.

While I have shown my invention in the particular embodiments above described, it will be understood that I do not limit myself to this exact construction, as I may employ equivalents known to the art at the time of the filing of this application without departing from the scope of the appended claims.

What I claim is:

1. In a headlight, the combination of a casing, a bearing plate secured to the casing and having an outwardly extending boss containing a bore opening into said casing, a sleeve movable longitudinally in said bore, a reflector in said casing, a plate secured to the lower portion of said reflector, said sleeve and said plate having cooperating ball and socket surfaces supporting said reflector and permitting rotary and tilting movements thereof in the casing, a spring in said bore engaging said sleeve to hold it against said plate, a bearing member carried by the upper portion of said reflector, and a bar connected with the upper portion of said casing on its inner surface and movable thereon to tilt said reflector, said bar and said bearing member having cooperating ball and socket surfaces permitting rotary and tilting movements of said reflector and restraining said sleeve from upward movement under the action of said spring beyond a position holding said ball and socket surfaces respectively in engagement with each other.

2. In a headlight, the combination of a casing, a bearing plate secured to the casing and having an outwardly extending boss containing a bore opening into said casing, a sleeve movable longitudinally in said bore, a reflector in said casing, a plate secured to the lower portion of said reflector, said sleeve and said plate having cooperating ball and socket surfaces supporting said reflector and permitting rotary and tilting movements thereof in the casing, a spring in said bore engaging said sleeve to hold it against said plate, a bearing member carried by the upper portion of said reflector, a bar connected with the upper portion of said casing on its inner surface and movable thereon to tilt said reflector, said bar and said bearing member having cooperating ball and socket surfaces permitting rotary and tilting movements of said reflector and restraining said sleeve from upward movement under the action of said spring beyond a position holding said ball and socket surfaces respectively in engagement with each other, said plate having an arm extending laterally therefrom, a block for rigid connection to an operating rod, and a pivotal connection between said block and said arm.

3. In a headlight, the combination of a casing, a bearing plate secured to the casing and having an outwardly extending boss containing a bore opening into said casing, a sleeve movable longitudinally in said bore, a reflector in said casing, a plate secured to the lower portion of said reflector, said sleeve and said plate having cooperating ball and socket surfaces supporting said reflector and permitting rotary and tilting movements thereof in the casing, a spring in said bore engaging said sleeve to hold it against said plate, a bearing member carried by the upper portion of said reflector, a bar connected with the upper portion of said casing on its inner surface and movable thereon to tilt said reflector, said bar and said bearing member having cooperating ball and socket surfaces permitting rotary and tilting movements of said reflector and restraining said sleeve from upward movement under the action of said spring beyond a position holding said ball and a socket surfaces respectively in engagement with each other, a tubular housing extending downwardly from the lower end of said boss and at an oblique angle to the axis thereof, a first rod extending through said sleeve and boss and secured to said plate, a second rod extending through said tubular housing, and a universal joint connecting said rods, whereby turning said second rod imparts rotary movement to said reflector.

4. In a headlight, the combination of a casing, a bearing plate secured to the casing and having an outwardly extending boss containing a bore opening into said casing, a sleeve movable longitudinally in said bore, a reflector in said casing, a plate secured to the lower portion of said reflector, said sleeve and said plate having cooperating bearing surfaces supporting said reflector and permitting rotary and tilting movements thereof in the casing, a spring in said bore engaging said sleeve to hold it against said plate, a bearing member carried by the upper portion of said reflector, and a bar connected with the upper portion of said casing on its inner surface and movable thereon to tilt said reflector, said bar and said bearing member having cooperating bearing surfaces permitting rotary and tilting movements of said reflector and restraining said sleeve from upward movement under the action of said spring beyond a position holding said bearing surfaces respectively in engagement with each other.

5. In a headlight, the combination of a casing, a bearing plate secured to the casing and having an outwardly extending boss containing a bore opening into said casing, a sleeve movable longitudinally in said bore, a reflector in said casing, a plate secured to the lower portion of said reflector, said sleeve and said plate having cooperating bearing surfaces supporting said reflector and permiting rotary and tilting movements thereof in the casing, a spring in said bore engaging said sleeve to hold it against said plate, a bearing member carried by the upper portion of said reflector, a bar connected with the upper portion of said casing on its inner surface and movable thereon to tilt said reflector, said bar and said bearing member having cooperating bearing surfaces permitting rotary and tilting movements of said reflector and restraining said sleeve from upward movement under the action of said spring beyond a position holding said bearing surfaces respectively in engagement with each other, a tubular housing extending downwardly from the lower end of said boss and at an oblique angle to the axis thereof, a first rod extending through said sleeve and boss and secured to said plate, a second rod extending through said tubular housing, and a universal joint connecting said rods, whereby turning said second rod imparts rotary movement to said reflector.

6. In a headlight, the combination of a casing having a curved outer surface, a mounting plate conformed to fit the outer surface of said casing and secured thereto, said mounting plate having an outwardly projecting central boss provided with a bore for receiving a rotary reflector support and a downwardly projecting clamp on each side of said boss, a supporting device comprising a first rod for engagement by said clamps and a second rod for engaging a relatively stationary part of a vehicle, and a hinge connection between said rods.

7. In a headlight, the combination of a casing having a curved outer surface, a mounting plate conformed to fit the outer surface of said casing and secured thereto, said mounting plate having an outwardly projecting central boss provided with a bore for receiving a rotary reflector support and a downwardly projecting clamp on each side of said boss, a supporting device comprising a first rod for engagement by said clamps and a second rod for engaging a relatively stationary part of a vehicle, and a hinge connection between said rods, each of said rods being cylindrical and angularly movable for adjustment in the part secured thereto.

8. In a headlight, the combination of a casing having a curved outer surface, a mounting plate conformed to fit the outer surface of said casing and secured thereto, said mounting plate having an outwardly projecting central boss provided with a bore for receiving a rotary reflector support and a downwardly projecting clamp on each side of said boss, said mounting plate having also a laterally projecting clamp, a second casing having a similar mounting plate, a bracing rod extending between and engaged by said laterally extending clamps, and supporting devices engaged by said downwardly projecting clamps.

9. In a headlight, the combination of a casing having a curved outer surface, a mounting plate conformed to fit the outer surface of said casing and secured thereto, said mounting plate having an outwardly projecting central boss provided with a bore for receiving a rotary reflector support and a downwardly projecting clamp on each side of said boss, said mounting plate having also a laterally projecting clamp, a second casing having a similar mounting plate, a bracing rod extending between and engaged by said laterally extending clamps, supporting devices engaged by said downwardly projecting clamps, a rotatable reflector mounted in the boss of each of said mounting plates, each of said casings having an opening therethrough in line with the opening in the corresponding laterally extending clamp, said brace rod being tubular, and a tie rod extending through said tubular brace rod and connecting said reflectors to effect simultaneous rotary movement thereof.

In witness whereof, I hereunto subscribe my name this 31st day of March, A. D. 1923.

ANDRES SOLOSABAL.